UNITED STATES PATENT OFFICE 2,271,232

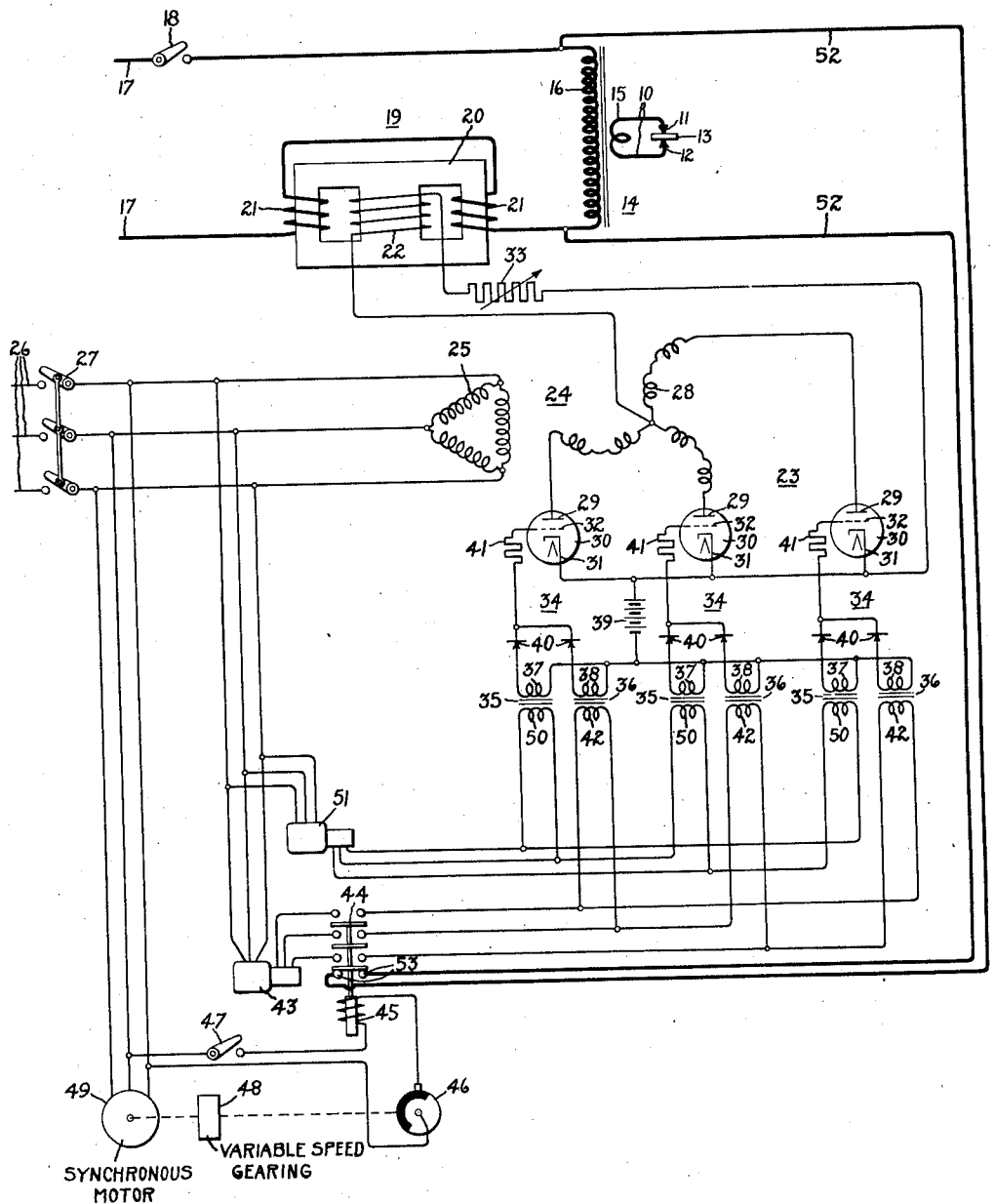
Inventor:
Erich Schröter,
by Harry E. Dunham
His Attorney.

ELECTRIC CONTROL CIRCUIT

Erich Schröter, Berlin-Chorlottenburg, Germany, assignor to General Electric Company, a corporation of New York Application June 14, 1940, Serial No. 340,614
In Germany July 15, 1939

6 Claims. (Cl. 171—242)

My invention relates to electric control circuits and more particularly to an improved arrangement for controlling the flow of current to a load circuit which may comprise the welding electrodes of an electric resistance welding machine.

Whenever one of the various methods of high-speed electric resistance welding can be applied, for example, where spot-welding or line-welding machines are used, it is periodically necessary to interrupt the circuit during the welding operation to form the plurality of spaced or overlapped welds. The means capable of interrupting the circuit must be able to do so a great many times per minute. Even at low speeds of operation, the use of mechanical switches for accomplishing this purpose has proved unsatisfactory and, where the welding circuit must be made and broken several hundred times per minute, they are entirely unsuitable.

Also, in butt welding and more specifically in the flash-welding type where the resistance at the junction is used as a means for generating the welding heat, it has been common practice to use large contactors in the primary circuit of the welding transformer to control the welding time. However, in this type of weld, at the time the metal fuses, there is practically a short circuit on the welding transformer and, when contactors are used to interrupt the circuit, they must do so under this very heavy load or short-circuit current condition, which tends to destroy them causing very high maintenance costs. Furthermore, sufficient arcing at the contactors often occurs under these conditions so that it is impossible to interrupt the circuit with the usual type of contactor.

The use of saturable reactors for such control purposes has been proposed but was found unsatisfactory for these high-speed resistance welding operations due to the long interval of time required to obtain substantial variations in the reactance thereof by virtue of the long time constant.

It is an object of my invention to provide a new and improved circuit-controlling arrangement including a saturable reactor, the impedance of which is controlled at high speed by controlling the direct-current magnetization thereof through an electric valve converting apparatus, whereby contactors and their inherent disadvantages may be eliminated from such control circuits.

It is another object of my invention to provide a current-controlling arrangement which will operate at very high speed for use in connection with electric resistance welding machines and wherein means are provided to prevent arcing upon separation of the welding electrodes.

Further objects and advantages of my invention will become apparent as the following description proceeds and the features of novelty which characterize my invention will be pointed out with particularity in the claims annexeed to and forming a part of this specification.

For a better understanding of my invention, reference may be had to the accompanying drawing in which the single figure thereof diagrammatically illustrates an electric control circuit embodying my invention.

Referring now to the drawing, I have illustrated therein my invention as applied to an arrangement for controlling the flow of current to a load circuit 10. It will be understood by those skilled in the art that this control scheme may have many uses but I have specifically illustrated it in an arrangement where the load circuit 10 includes the welding electrodes of a high-speed electric resistance welding machine which electrodes are diagrammatically illustrated at 11, 12. A work piece 13 is shown interposed between the electrodes. The load circuit 10 is energized through an electric translating apparatus comprising a transformer 14 whose secondary winding 15 is connected to load circuit 10 and whose primary winding 16 is connected to a suitable source of alternating potential 17 through a switch 18 for supplying the necessary energy for the load circuit 10.

In order to control the current flowing in load circuit 10, I provide a variable reactance device comprising a saturable reactor 19 connected in series with the primary winding 16 of transformer 14 for controlling the impedance of this circuit. Saturable reactor 19 is provided with a three-legged core 20 upon the outer legs of which are wound variable reactance windings 21 connected in series with one another and with the primary winding 16 of transformer 14. The impedance of variable reactance windings 21 is controlled by controlling the saturation of the core and this is accomplished by means of a direct-current saturating winding 22 wound upon the center leg of core 20. Thus, by properly controlling the energization of saturating winding 22, the impedance of windings 21 to alterating current from source 17 may be controlled over a wide range varying from substantially no impedance when core 20 is fully saturated to the maximum impedance of variable reactance windings 21 when core 20 is fully unsaturated.

This maximum impedance is of such magnitude as to allow substantially no current to flow in the load circuit 10. In other words, when the core 20 is wholly unsaturated, substantially all the voltage of alternating-current supply circuit 17 appears across saturable reactor 19 and little or no voltage appears across the primary winding 16 of transformer 14. The use of such a saturable reactor for controlling a load circuit is disclosed and claimed in a copending application Serial No. 316,788, filed February 1, 1940, on behalf of Martin A. Edwards and assigned to the same assignee as the present application.

However, the building up of flux in core 20, and especially the decaying of this flux when it is desired to increase the impedance of variable reactance windings 21, requires a relatively long time so that saturable reactors without additional control means are unsuitable for controlling load circuits where high-speed control is necessary, such as in resistance welding machines, for example. One means of obtaining such high-speed control is disclosed and claimed in the above-mentioned copending application. My invention comprises another means for obtaining such high-speed control of the impedance of variable reactance windings 21 by energizing saturating winding 22 of saturable reactor 19 with direct current from an electric valve converting apparatus 23 which is arranged to be controlled at various times either as a rectifier or an inverter, whereby high-speed changes in the reactance of saturable reactor 19 may be obtained.

The electric valve converting apparatus 23 includes a main power transformer 24 having a primary winding 25 connected to a source of alternating potential 26 through switch 27. In the particular arrangement shown, alternating-current source 26 is illustrated as a three-phase source. A zig-zag Y-connected secondary winding 28 is inductively associated with primary winding 25 of transformer 24, the terminals of which are connected to the anodes 29 of a plurality of electric discharge valves 30, having their cathodes 31 connected together at a common potential which forms the positive terminal of the direct-current circuit for saturating winding 22 when the electric valve converting apparatus 23 is operating as a rectifier. Electric discharge valves 30 are also provided with control electrodes or grids 32. By way of example, I have illustrated electric discharge valves 30 as comprising a plurality of individual devices including separate anodes and cathodes contained in separate envelopes. It will be understood by those skilled in the art that electric discharge valves 30 might equally well comprise a multianode single-cathode type of valve. Furthermore, any of the several types of electric discharge valves well known in the art may be used, although I prefer to use valves of the vapor electric discharge type.

The direct-current circuit of the electric valve converting apparatus 23 is connected to energize saturating winding 22 of saturable reactor 19 through variable resistor 33. The resistance of resistor 33 is adjusted to give the most favorable L/R ratio and consequent short-time constant so that maximum speed of control of the current flowing in load circuit 10 may be obtained.

The control of the saturation of saturable reactor 19 and, hence, also of the current flowing in load circuit 10 is obtained by controlling the operation of the electric valve converting apparatus 23. Accordingly, each of the electric discharge valves 30 is provided with an excitation circuit 34 which includes the respective control electrodes or grids 32 of the associated discharge valves. In addition, these circuits 34 each comprise a pair of grid transformers 35 and 36 having one terminal of their secondary windings 37 and 38, respectively, connected through a suitable bias battery 39 to the cathodes 31 of electric discharge valves 30. The other terminals of secondary windings 37 and 38 are connected through unilaterally conductive devices 40 and current-limiting resistors 41 to the control electrodes or grids 32 of electric discharge valves 30. Unilaterally conductive devices 40 are provided so as to prevent short-circuiting of potential from one of the secondary windings 37 or 38 through the other secondary winding. Negative bias battery 39 tends to hold the control electrodes 32 at a negative potential relative to cathode 31.

Electric valve converting apparatus 23 may be operated as a rectifier so that a controlled direct current is supplied to the saturating winding 22 of saturable reactor 19 depending upon the load on load circuit 10. This is accomplished by supplying a component of rectifier excitation to the excitation circuits 34 of electric discharge valves 30. Accordingly, I provide that the primary windings 42 of grid transformers 36 are energized sequentially with a component of rectifier excitation from three-phase alternating potential source 26 through a suitable phase-shifting transformer 43 and switching means 44. In order periodically to control load circuit 10 when it is supplying a welding load of the type performing a plurality of spaced or overlapped welds, I provide a timing circuit for controlling the operation of switch 44 which, in turn, controls the operation of electric valve converting apparatus 23 so as to cause a periodic low of saturating current in the direct-current circuit including saturating winding 22 of saturable reactor 19. Switching means 44 is illustrated by way of example as a mechanical switch but it will be understood by those skilled in the art that suitably controlled electric discharge valves may be substituted therefor as well as corresponding control means which will operate in the same manner as the means to be described hereinafter. Switching means 44 is operated periodically by solenoid 45 arranged to be energized through a suitable contactor 46 and switch 47 from a source of potential, such, for example, as source 26. Contactor 46 is illustrated as of the rotating type driven at constant speed through variable speed gearing 48 from synchronous motor 49 energized from alternating potential source 26. By suitably adjusting the gear ratios of variable speed gearing 48, the periodic operation of electric valve converting apparatus 23 may be adjusted to give any desired periodicity of control of load circuit 10 which may be connected to energize a high-speed resistance welding apparatus. Therefore, by changing the adjustments of the timing circuit controlling electric valve converting apparatus 23, the duration of the heating process of the welding apparatus connected to load circuit 10 may be controlled.

In spite of the favorable time constant of the direct-current circuit including saturating winding 22 of saturable reactor 19, the decay of flux in core 20, when the saturating current through winding 22 is interrupted, requires a sufficiently long time so as to be unsatisfactory for high-speed resistance welding operations. To increase this speed of decay of flux, I provide means for operating electric valve converting apparatus 23 as an inverter at the instant it is desired to demagnetize core 20 of saturable reactor 19 so as to dissipate the magnetic energy stored in saturable reactor 19 within the shortest possible time by returning it to alternating-current circuit 26. This is accomplished by providing an inverter component of excitation for the control electrodes 32 of electric discharge valves 30. Accordingly, primary winding 50 of grid transformers 35 are arranged to be energized with inverter excitation through a suitable phase-shifting transformer 51 from alternating-current source 26. The inverter excitation applied to grid transformers 35 may be continually supplied since electric valve converting apparatus 23 will operate as an inverter only to dissipate the magnetic energy stored in saturable reactor 19. Therefore, it is only necessary to control the component of rectifier excitation. Since the component of rectifier excitation occurs first during the alternating-current cycle, the later following inverter component of excitation would be ineffective.

Although I have disclosed an arrangement including a mechanical switching means 44 for periodically removing the component of rectifier excitation, it will be understood by those skilled in the art that other means for accomplishing this result may be utilized. For example, the arrangement disclosed in United States Reissue Patent No. 20,493 granted September 7, 1937, upon an application of B. D. Bedford and assigned to the same assignee as the present invention may be utilized.

Even though saturable reactor 19 substantially makes and breaks the circuit energizing load circuit 10, nevertheless, the magnetic energy stored in windings 21 of saturable reactor 19 as well as in the windings of transformer 14 when substantially no current flows in load circuit 10 by virtue of the high impedance afforded by variable reactance windings 21 is such as to cause undesirable arcing when welding electrodes 11, 12 are separated for removing the work 13 therefrom. Such arcing would also occur if switch 18 were actuated to interrupt the circuit. Accordingly, I provide a bypassing circuit 52 by means of which the primary winding 16 of transformer 14 is bypassed or short circuited whenever saturable reactor 19 is desaturated so as substantially to interrupt the current in load circuit 10. In order to prevent the short circuiting or bypassing of primary windings 16 of transformer 14 when the core 20 of saturable reactor 19 is completely saturated, the operation of this bypassing circuit 52 must be interlocked so that it is ineffective whenever rectifier current flows in saturating winding 22. Accordingly, the bypassing circuit 52 may be controlled by means of a relay energized by rectifier current flowing in the direct-current circuit including saturating winding 22, or by means of an undervoltage relay connected in parallel with either the primary or secondary windings of transformer 14, or by the arrangement illustrated wherein switch 44, controlling the periodic application of rectifier excitation, also controls the by-passing of short circuiting of primary winding 16 of transformer 14. Contacts 53 in this bypassing circuit are arranged to be bridged by switching means 44 whenever switching means 44 interrupts the supply of rectifier excitation to electric valve converting apparatus 23. By this arrangement, the welding electrodes 11, 12 may be separated at any time after the full impedance of saturable reactor 19 is connected in series with the primary winding 16 of transformer 14 without giving rise to an arc formation.

The operation of the control apparatus will be considered with reference to the particular condition of the circuit illustrated in the drawing. Even though switch 18 is closed, the work 13 may be removed or clamped between welding electrodes 11, 12 without any sparking because the welding transformer is short circuited or by-passed by circuit 52 and contacts 53, which are bridged by switching means 44. Furthermore, since no current flows in saturating winding 22, the full impedance of variable reactance windings 21 is connected in series with the primary windings 16 of transformer 14 so that load circuit 10 is effectively interrupted. By closing switch 27, synchronous motor 49 drives rotating contactor 46 through variable speed gearing 48 which may be adjusted to give the desired periodicity of the current flowing in load circuit 10. It will be understood that this might also be accomplished by adjusting the conducting segment of rotating contactor 46. The closing of switch 27 causes components of inverter excitation to be impressed on electric valve converting apparatus 23 but, since there is no source of potential associated with the direct-current circuit including saturating winding 22 when the core 20 of saturable reactor 19 is wholly unsaturated, these excitation components are ineffective in so far as electric valve converting apparatus 23 is concerned. If, now, switch 47 is closed, the timing circuit including rotating contactor 46 by virtue of the operation of switching means 44 will cause components of rectifier excitation to be applied periodically to the excitation circuits 34 of electric valve converting apparatus 23 so that the core 20 of reactor 19 is saturated periodically and very rapidly to the desired amount controlled by the adjustment of phase-shifting transformer 43. By-passing circuit 52 is opened automatically by switching means 44 whenever rectifier excitation is supplied. Because of the short time constant of the circuit including saturating winding 22, the flux in core 20 is built up very rapidly so as effectively to energize load circuit 10 in the same manner as a switch. As soon as the timing circuit causes interruption of rectifier excitation supplied to electric valve converting apparatus 23, the inverter excitation which is continually applied becomes effective, causing electric valve converting apparatus 23 to function as an inverter dissipating the magnetic energy stored in saturable reactor 19 within a very short period of time by returning it to supply circuit 26. The use of resistance 33 in the direct-current circuit including saturating winding 22 also tends to accelerate the decay of flux during the inverter operation. At the same time, the primary winding 16 of transformer 14 is bypassed by means of circuit 52 controlled by switching means 44 and substantially all of the supply potential 17 is impressed across saturable reactor 19 so that load circuit 10 is effectively interrupted and welding electrodes 11 and 12 may be separated without arcing.

It will be understood by those skilled in the art that, while I have illustrated and described a particular embodiment of my invention, modifications thereof will occur to those skilled in the art. I desire it to be understood, therefore, that my invention is not to be limited to the particular arrangement disclosed and I intend in the appended claims to cover all modifications which do not depart from the spirit and scope of my invention.

What I claim as new and desire to secure by Letters Patent of the United States is:

1. In combination, a load circuit, an alternating-current supply circuit, an electric translating apparatus interconnecting said circuits, means for controlling said load circuit comprising a reactance device connected in series with said translating apparatus, means including a direct-current winding for said reactance device for varying the impedance of said device, an electric valve converting apparatus including electric valve means having a control member, means for impressing on said control member a control voltage, said converting apparatus being energized from a source of alternating current for supplying direct current for said direct-current winding, and means for periodically controlling said control voltage to cause said converting apparatus to act as an inverter and dissipate very rapidly the flux built up in said reactance device when deenergizing said load circuit.

2. In a control apparatus for a load circuit, an alternating-current supply circuit, an electric translating apparatus interconnecting said circuits, high-speed means for controlling said load circuit comprising a saturable reactor connected in series with said translating apparatus, means including a saturating winding for said reactor for varying the impedance thereof, an electric valve converting apparatus including electric valve means having a control member, means for impressing on said control member a control voltage, said converting apparatus being energized from a source of alternating current for supplying direct current for said saturating winding of said reactor, and means for controlling said control voltage to cause said converting apparatus to act as an inverter and desaturate said reactor rapidly and increase the impedance thereof when effective interruption of said load circuit is desired.

3. In combination, a load circuit, an alternating-current supply circuit, an electric translating apparatus interconnecting said circuits, high-speed means for controlling said load circuit comprising a saturable reactor connected in series with said translating apparatus, a saturating winding for said reactor, an electric valve converting apparatus including a control circuit energized from a source of alternating current for periodically energizing said saturating winding with direct current, means for continuously supplying a component of inverter excitation to said control circuit whereby said electric valve converting apparatus tends to dissipate rapidly any energy stored in said saturable reactor when effective interruption of said load circuit is desired, and means for periodically supplying a component of rectifier excitation to said control circuit when it is desired to supply energy to said load circuit whereby high-speed control of the current flowing in said load circuit is obtained.

4. In a control apparatus for a load circuit, an alternating-current supply circuit connected so as to energize said load circuit, high-speed means for controlling said load circuit comprising a saturable reactor including a direct-current saturating winding, an electric valve converting apparatus including electric valve means having a control member, means for impressing on said control member a control voltage, said converting apparatus being energized from a source of alternating current for supplying the direct current for said saturated winding, and means for controlling said control voltage to cause said converting apparatus to act alternately as a rectifier and an inverter whereby the impedance of said saturable reactor is varied at high speed to make and interrupt said load circuit effectively.

5. In combination, a load circuit, an alternating-current supply circuit, an electric translating apparatus interconnecting said circuits, high-speed means for controlling the flow of current in said load circuit comprising a saturable reactor including a direct-current saturating winding, an electric valve converting apparatus arranged to be operated as a rectifier for supplying direct current to said saturating winding, means for operating said electric valve converting apparatus as an inverter to dissipate rapidly any energy stored in said saturating winding and effectively interrupt said load circuit, and means for bypassing said alternating-current supply circuit around said electric translating apparatus when said electric valve converting apparatus is operating as an inverter so that said load circuit is completely deenergized.

6. A welding system comprising an alternating-current circuit, high-speed means for controlling said circuit including a saturable reactor connected therein, a direct current saturating winding for said reactor, an electric valve converting apparatus connected to said direct current saturating winding, said electric valve converting apparatus including electric valve means having a control member, means for impressing on said control member a control voltage, and means for controlling said control voltage to cause said converting apparatus to act alternately as a rectifier and inverter for varying the impedance of said saturable reactor whereby high-speed control of the current flowing in said welding circuit is obtained.

ERICH SCHRÖTER.